(12) United States Patent
Battaglia

(10) Patent No.: US 10,949,335 B2
(45) Date of Patent: Mar. 16, 2021

(54) DESIGNER DEFINED MOCKING SERVICE BEHAVIOR

(71) Applicant: salesforce.com, inc., San Francisco, CA (US)

(72) Inventor: Martin Battaglia, Pilar (AR)

(73) Assignee: salesforce.com, inc., San Francisco, CA (US)

( * ) Notice: Subject to any disclaimer, the term of this patent is extended or adjusted under 35 U.S.C. 154(b) by 135 days.

(21) Appl. No.: 16/252,263

(22) Filed: Jan. 18, 2019

(65) Prior Publication Data

US 2020/0233790 A1 Jul. 23, 2020

(51) Int. Cl.
*G06F 11/00* (2006.01)
*G06F 11/36* (2006.01)
*G06F 9/54* (2006.01)
*H04L 29/08* (2006.01)

(52) U.S. Cl.
CPC .......... *G06F 11/3688* (2013.01); *G06F 9/547* (2013.01); *G06F 11/3664* (2013.01); *G06F 11/3672* (2013.01); *H04L 67/1097* (2013.01)

(58) Field of Classification Search
CPC ............ G06F 11/3668; G06F 11/3664; G06F 11/3672; G06F 11/3684; G06F 11/3696; G06F 11/3688
See application file for complete search history.

(56) References Cited

U.S. PATENT DOCUMENTS

| 10,089,219 | B1 * | 10/2018 | Bates | G06F 11/3688 |
| 2015/0135158 | A1 * | 5/2015 | Tenev | G06F 11/3684 717/101 |
| 2017/0139816 | A1 * | 5/2017 | Sapozhnikov | G06F 8/60 |

* cited by examiner

*Primary Examiner* — Charles Ehne
(74) *Attorney, Agent, or Firm* — Holland & Hart LLP

(57) ABSTRACT

A mocking service generates a mock implementation of an API based on a API specification. Request and response behavior of the mock implementation of the API may be controlled by a separate API behavior file. The API behavior file may be parsed by the mocking service to generate behavior logic. When an API request is transmitted to the mock implementation of the API, the behavior logic is invoked and may control execution of the mock implementation of the API and the details of a generated response. Behaviors defined in the API behavior file may be global or resource specific and may include, for example, time delays, error rates, error codes, conditions, response overrides, etc.

19 Claims, 12 Drawing Sheets

DESIGNER DEFINED MOCKING SERVICE BEHAVIOR

FIELD OF TECHNOLOGY

The present disclosure relates generally to database systems and data processing, and more specifically to designer defined mocking service behavior.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

A cloud platform may be used by developers to test application program interface (API) specifications and to configure services for interacting with APIs according to the API specification. Mocking services can be used to generate and test "prototypes" of APIs. For example, these prototypes may simulate how full implementations of APIs respond to different API requests. When a mocking service simulates a full implementation of an API, simulation behavior may be limited to the behaviors encoded in the API specification, which may not entirely correspond to the behavior of a full implementation of the API.

DETAILED DESCRIPTION

Figure 1:
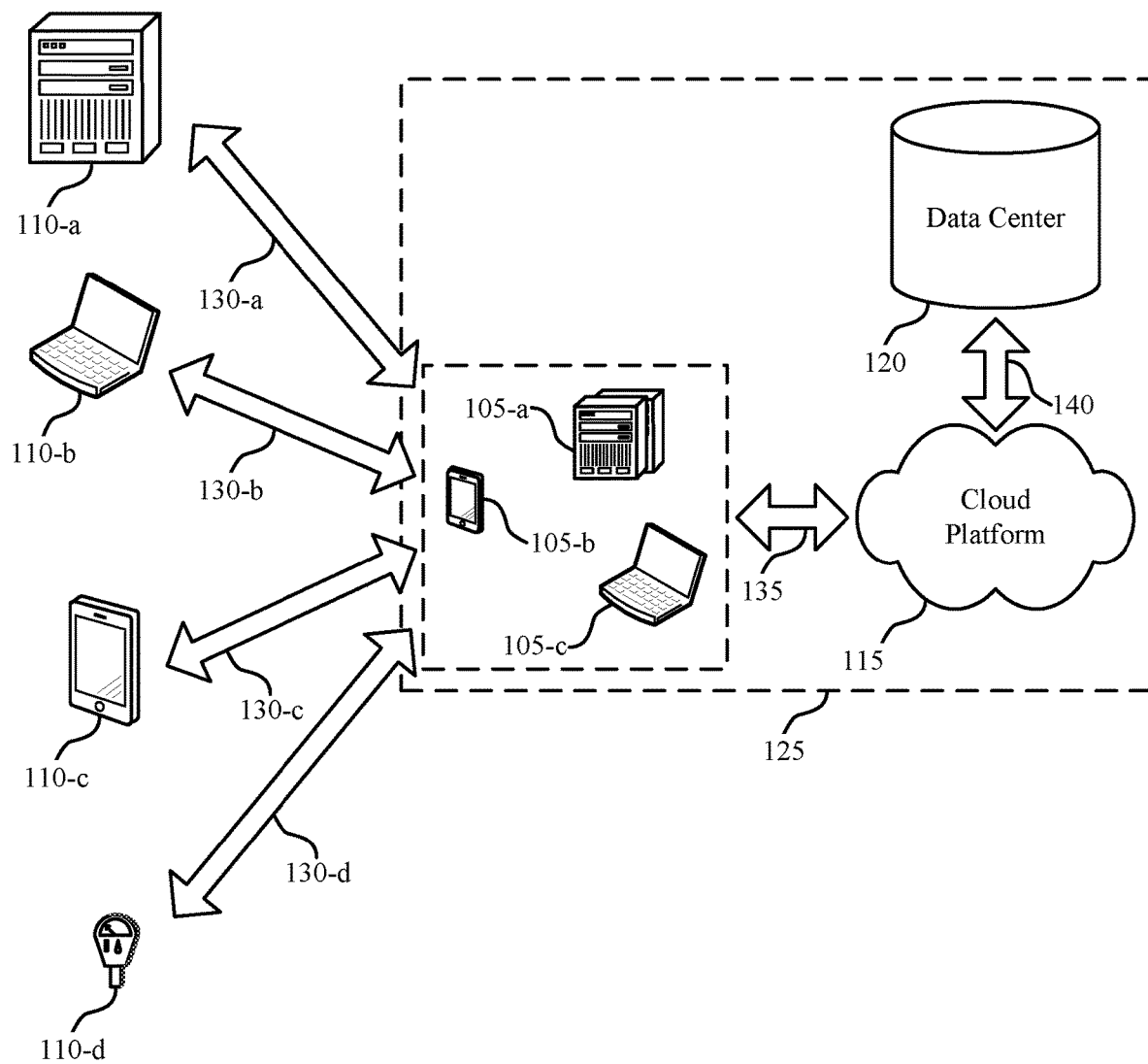
FIG. 1 illustrates an example of a system for testing an application programming interface (API) at a server that supports designer defined mocking service behavior in accordance with aspects of the present disclosure.

A mocking service that allows a mock implementation of an API specification to behave according to a separate behavior file invoked when a mocking implementation of the API specification is executed and when requests are sent to the mocking implementation. The behavior file may be defined in a mocking service language (MSL) and may define global behaviors (delays, error rate, error codes), specific behaviors for specifically requested resources, conditions to be evaluated to determine response payloads, and may define scenarios to override parts of responses. Accordingly, services interacting with the API corresponding to the API specification may be configured to interact with the API according to different behavior scenarios. This allows the designer to avoid defining specific and varying behaviors in the API specification and prevents APIs from being redeployed based on a behavior adjustment.

The mocking service may parse an API specification that is linked to the behavior and generate a mock implementation based on the parsed API specification. The behavior file may be linked to the API specification based on the API specification and the behavior file having the same or a similar file name, the API specification having an import statement in the body of the file, or via another linking methodology. The API behavior file may also be parsed to generate behavior logic. When the mock implementation of the API specification is invoked in memory of a computing system (e.g., a server), the server may utilize the behavior logic to determine operations for generating and transmitting responses to API requests to the API specification. For example, a user device may transmit a request (e.g., an API request) to the mock implementation, the server may run the mock implementation of the API and return a response to the request according to the mock implementation and the API behavior file.

In some cases, the API behavior file may define a time period for delaying a response to the request received at the API specification. For example, the API designer may know that a specific operation that will be defined in a full API may be an expensive operation as it relates to computing resources (e.g., processing/memory resources). As such, the designer may define a time delay for the operation. The operation may be associated with a resource, which is requestable at the API (e.g., the API specification). The designer may assign the delay to the resource, and when the resource is requested at the mock implementation of the API specification, the time delay may be invoked according to the API behavior file.

Behaviors defined in the API behavior file may define global parameters, such as delays, error rate, status codes, etc., and may also define specific behaviors (e.g., behaviors assigned to specific resources). In some cases, the behaviors may override responses generated by the mock implementation of the API specification. Because the API behavior file is separate from the API specification, the behaviors may be modified by a designer without needing to redeploy (e.g., reparse and regenerate the mock implementation) the API specification. As such, the API designer is not required to encode all specific behaviors in the API specification, and/or the mocking service is not required to reload/reparse the API specification for changed behaviors.

In some cases, the API behavior file may define a condition to be evaluated when a request is received. The condition may be associated with a specific resource defined in the API specification, and the condition may be based on query parameters, payload values, uniform resource identifiers (URIs), etc. that may be included in the request. For example, a first value included in a request may trigger return of a first resource, and a second value included in a request may trigger return of a second resource.

Aspects of the disclosure are initially described in the context of an environment supporting an on-demand database service. Aspects of the disclosure are further described in the context of a server diagram and a process flow diagram supporting designer defined mocking service behavior. Aspects of the disclosure are further illustrated by and described with reference to apparatus diagrams, system diagrams, and flowcharts that relate to designer defined mocking service behavior.

FIG. 1 illustrates an example of a system 100 for cloud computing that supports designer defined mocking service behavior in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The cloud platform 115 may include a server, such as a mocking server, which hosts an API mocking service. In some cases, the server may include aspects of an application server as described herein. The mocking service may support secure, efficient API testing and validating. The mocking service may expose an endpoint of the API to a user, which may be an example of a cloud client 105 or a contact 110. The user may be an example of a tenant of the mocking server. The user may use the endpoint to test the API prior to full implementation (e.g., publishing) of the API. The testing may be based on an API specification and its underlying metadata. An API specification may refer to a document or program that defines at least a portion of the functionality of an API (e.g., including any combination of behaviors, definitions, documentation, etc., for the API). The user or other developers may validate whether the API is functioning properly and troubleshoot any problems with the API based on results of the mocking service.

A user testing the API specification based on the parsed model may receive only static responses, which are generated based on the API specification. Current mocking services may generate the static responses to requests sent to a mocking instance of the API specification, and the API specification may behave statically. This static behavior may be due to API specifications not being fully developed versions of the API, mocking services not being configured to respond to requests in a dynamic manner based on the API specification as would be expected in a full implementation of an API that corresponds to an API specification, and the mocking service being configured to return only the resources as defined in the API specification. Furthermore, to encode specific behaviors in an API specification may require the API to be updated and redeployed (e.g., parsed) for different behaviors, which may utilize significant processing resources. Supporting only static behavior based only on a API specification (e.g., a not fully developed API) may limit the accessibility of the mocking service to users who are building tools or services that may interact with the fully developed API. Furthermore, static behavior may not fully reflect the behavior of a fully developed API, and as such, any interacting services or tools may not be configured for unexpected behavior.

To enhance functionality and accessibility of the mocking service in the system 100, the mocking server may support API behavior files that define how the mock implementation of the API behaves in responding to API requests directed to the API behavior file. The mocking server may parse the API behavior file to generate behavior logic that is invoked when requests are sent to the mock implementation of the API, and the mock implementation of the API is executed and responses are generated based on the behavior logic. The behavior logic allows a service to be configured for interacting with a simulation of a full implementation of the API corresponding to the API specification and for interacting with different response scenarios of the API. Because the API behaviors may be encoded in the separate API behavior file, the behaviors may be changed without needing to reparse the API specification, generate API endpoints for testing the API specification, and dispersing the endpoints to designers (e.g., as would be required if the API specification is changed). This may save significant computing resources, such as processing and memory resources.

It should be appreciated by a person skilled in the art that one or more aspects of the disclosure may be implemented in a system 100 to additionally or alternatively solve other problems than those described herein. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

In an example, a developer may design an API specification for an API using the system 100. The API may not yet be released, so the developer may be testing the API to check its functionality and verify whether the API is ready for publishing. The developer may use the mocking service described herein to generate a mock implementation of the API and may also design expected API behaviors in a separate behavior file. The developer may use a user device (e.g., as a cloud client 105) to interact with the mocking service via a user interface of the user device, and the developer may further share an endpoint for interacting with the API to other developers for testing and designing tools or services that may interact with the API. Because the API is not fully developed, the API behavior file defines behaviors that are enacted when requests are transmitted to the mock implementation of the API specification, such that response scenarios may be considered. For example, a designer may encode a lengthy response delay in the behavior file such that a developer can design a user interface or visual indicator that specifies that a response is expected.

Figure 2:
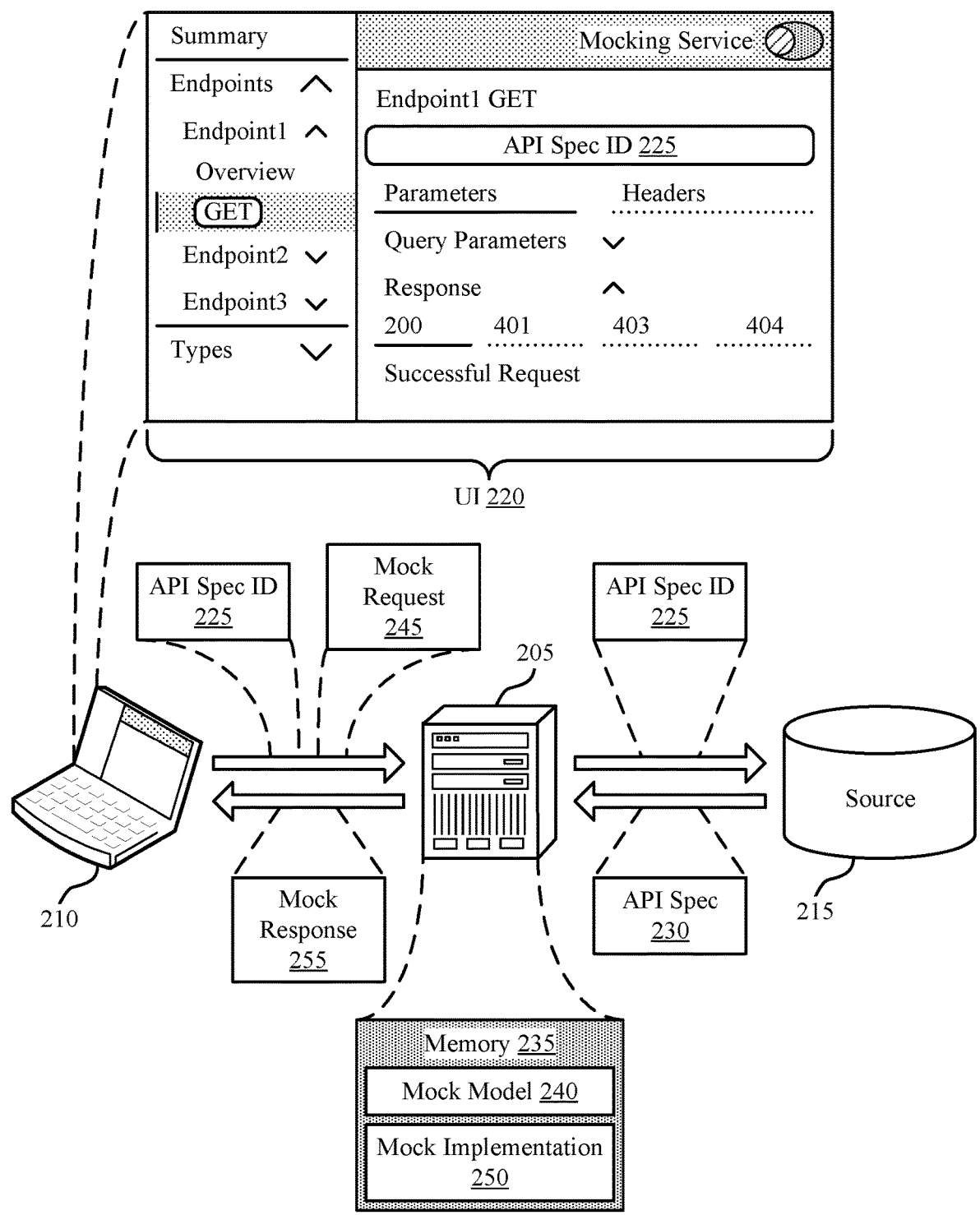
FIG. 2 illustrates an example of a system that supports designer defined mocking service behavior in accordance with aspects of the present disclosure.

FIG. 2 illustrates an example of a mocking service 200 that supports designer defined mocking service behavior in accordance with aspects of the present disclosure. The mocking service 200 may include a server 205, which may be an example of a mocking server or application server. This server 205 may be a single server, a server cluster, a container, a virtual machine, or any other device or system for running mock implementations 250 of API specifications 230. The server 205 may receive information from a user device 210 (e.g., via a user interface 220) to generate mock models 240 and execute mock implementations 250. Additionally, in some cases, the server 205 may retrieve API specifications 230 and API behavior files from one or more sources 215. A source 215 may be an example of an internal repository to the server 205 or a system served by the server 205, an external repository to the server 205, a shared code repository, a file upload, a database, a data store, a cloud-based storage entity, or some combination of these or other storage systems. In some cases, the server 205 or user device 210 may operate as the source 215 for an API specification 230.

The mocking service 200 may support secure, efficient API testing and validation. The mocking service user interface 220 may allow a user operating the user device 210 to simulate requests to an API in order to test that the API is functioning properly, troubleshoot problems, and/or to demo the API. For example, the mocking service 200 may expose an endpoint to a user-via the user interface 220—that the user may use for testing an API prior to full implementation (e.g., publishing) of the API. This testing may be based on an API specification 230, its underlying metadata, and one or more API behavior files. An API specification 230, as described herein, may refer to any document or program that defines at least a portion of the functionality of an API (e.g., including any combination of behaviors, definitions, documentation, etc. for the API). The user may validate whether the API is functioning properly based on results of the mocking service 200.

In some cases, the mocking service 200 may be an extension of an API designer application (e.g., an API designer web tool). The API designer application may support a user creating new API specifications 230 and/or editing existing API specifications 230. For example, a user may design an API at the user device 210 in a web tool with a built-in parser. This parser may be specific to an API modeling language (e.g., representational state transfer (REST)ful API modeling language (RAML)) and may parse the user-defined API specification 230 to generate a mock model 240 for the API. The user device 210 may send this pre-parsed mock model 240 to the server 205, and the server 205 may store the mock model 240 in memory 235. In some cases, the parse may also be configured to parse an API behavior file that is associated with the API specification 230. The API behavior file may consist of a mocking service language (MSL) and may define global behaviors as well as resource specific behaviors. The server 205 may store the parsed behavior file as behavior logic in the memory 235. To test the API specification 230, the user may input requests to the API in the mocking service user interface 220. If the mocking service 200 is turned on (e.g., a mocking service switch is toggled to indicate that the mocking service 200 is 'ON'), the server 205 may receive the mock request 245 and simulate the request using the pre-parsed mock model 240 and the behavior logic in memory. This simulation may be referred to as a mock implementation 250 or mock instance. The server 205 may determine a mock response 255 based on the mock implementation and the behavior logic and may return the mock response 255 to the user device 210. This response may be displayed in the user interface 220. For example, the mock response 255 may include one or more hypertext transfer protocol (HTTP) status codes (e.g., "200," "401," "403," and "404" as illustrated in FIG. 2), one or more error messages, one or more requested resources of the mock implementation 250, or some combination of these responses. In this way, the mocking service 200 may simulate a real implementation of an API but may return a simulated (i.e., "mock") result.

In these cases where the mocking service 200 is built into an API designer tool, a user may validate an API specification 230 created or modified in the API designer tool using feedback from the mocking service 200. Based on the mock response 255 received from the server 205, the user may iterate on the design of the API specification 230, simulate the updated API, receive further feedback, validate whether the API operates as desired, and design a service for interacting with the API based on the API specification 230. A user may loop through this procedure as many times as necessary within the API designer application prior to publishing the API to test the API specification 230 for errors or bugs. Once satisfied, the user may publish the API for reuse by a wider set of users (e.g., any users, users with specific licenses or authentication tokens, users with certain security credentials, etc.).

In other cases, the mocking service 200 may operate as a standalone service (e.g., independent of an API designer tool, as illustrated in FIG. 2). In these cases, the mocking service 200 may allow a user to input an API specification identifier 225 into a user interface 220. This API specification identifier 225 may indicate an API specification 230 and/or a API behavior file for the server 205 to retrieve from a source 215. Additionally, the API specification identifier 225 may specify how to retrieve the API specification (e.g., the user may provide the source 215 and any authentication needed to access information from the source 215). The format for the API specification identifier 225 may depend on the source 215 of the API specification 230. For example, different sources 215 may use different project identifiers, organization identifiers, version values, or some combination of these or other identification parameters to identify the indicated API (and the corresponding API specification 230). Particular API specification identifier 225 formats for different sources 215 may be documented (e.g., in a public portal) for user access. Based on the API specification identifier 225 received from the user device 210, the server 205 may retrieve the indicated API specification 230 from the corresponding source 215. Alternatively, the user may upload the API specification 230 directly to the server 205. In such an example, the user device 210 may be regarded as the source 215 of the API specification 230, and the API specification identifier 225 may be an explicit or implicit indication that the information provided to the mocking service 200 from the user includes the API specification 230 for simulation.

The server 205 may then parse the retrieved API specification 230 and/or the API behavior file on-the-fly in memory 235. In some cases, the server 205 may contain a universal parser to handle API specifications 230 written using multiple different API design languages. For example, the universal parser may be an example of an API modeling framework (AMF) parser internal to the server 205. The server 205 may parse the API specification 230 to generate a mock model 240 for the API and may persist the mock model 240 in memory 235. This specification parsing process may be transparent to the user providing the API specification identifier 225. The API behavior file may consist of a universal mocking service language (MSL) that is configured to control the behavior of mock implementations based on different API design languages.

The user may simulate mock requests 245 to this mock model 240 via the user interface 220. An API request may be formatted as a link to a particular uniform resource locator (URL) and may include an endpoint, a method, one or more headers, and a set of data (i.e., the body of the request). For example, as illustrated in FIG. 2, the user may select "Endpoint1" as the endpoint for the mock request 245 in the user interface 220 and may test a "GET" method. Other methods supported by the mocking service 200 may include "PUT," "POST," "PATCH," "DELETE," or some combination of these or other API methods. A mock request 245 may include all or a subset of the parameters of a regular API request. For example, in some cases, a mock request 245 may not include data, and instead the API specification 230 may define values to use as mock data when performing testing on the API. To handle a mock request 245 sent by the user device 210, the server 205 may generate a mock implementation 250 of the API based on the mock request 245. This mock implementation 250 (i.e., a mock instance) may simulate the API handling and responding to such an API request, and may be temporarily cached in memory 235 at the server 205. To securely test the API, the server 205 may run the mock implementation 250 of the API internal to the server 205 without any database access. This may prevent the server 205 from altering any data at a database when the mocking service 200 is activated. Furthermore, running the mock implementation 250 internal to the server 205 may reduce the processing time for the mock instance (e.g., as compared to mocking procedures that use external connections to retrieve information during the mocking procedures).

Running the mock implementation 250 based on the mock request 245 may result in a mock response 255. This mock response 255 may simulate an API response to an API request containing the same or similar parameters as the mock request 245. As such, this mock response 255 may be based on information in the API specification 230 (e.g., methods, data types, parameters, metadata, etc.) as well as information in the API behavior file. The server 205 may transmit the mock response 255 to the user device 210 in response to the mock request 245. The user device 210 may display the mock response 255 in the user interface 220. For example, as illustrated, the user interface 220 may display a mock response 255 with an HTTP status code of "200," indicating that the mock model 240 successfully handled the mock request 245. Other mock responses 255 may indicate problems with handling a mock request 245 using HTTP status codes, error messages, resource data, or a combination of these. These mock responses 255 may additionally indicate where the problem may have occurred (e.g., a status code in the 400s may indicate an error originating from the client, such as user device 210, while a status code in the 500s may indicate an error originating from the server 205). Based on the mock response 255 displayed in the user interface 220, the user may determine how to modify an API, an API specification 230, an API request, or a service interacting with the API. By handling API specification 230 parsing and mock implementations 250 internally at the server 205, the mocking service 200 may support robust API simulations across multiple API design languages and sources 215.

In some cases, the API designer may also define expected API behaviors in a separate API behavior file. As noted, the API behavior file may include MSL that encodes behavior logic for the mock implementation of the API specification. The API behavior file may be parsed by the server 205 to generate the behavior logic. When the requests 245 are transmitted to the mock implementation 250, the behavior logic may be processed contemporaneously (e.g., simultaneously, before, and/or after) with the mock implementation 250. In some cases, the behavior logic may encode behaviors prior to execution of the mock implementation 250. Such behaviors may include verifying or modifying the mock requests 245, identifying requested resources, etc. The behavior logic may also encode behaviors after execution of the mock implementation 250. Such behaviors may include verifying or modifying mock responses 255 generated by execution of the mock implementation 250 or delaying transmission of mock responses 255 generated by execution of the mock implementation 250. Because the behavior logic may define expected behavior of a full implementation of the API, a developer designing a robust tool or service that interacts with the API without having to wait for the full implementation of the API to be designed.

Figure 3:
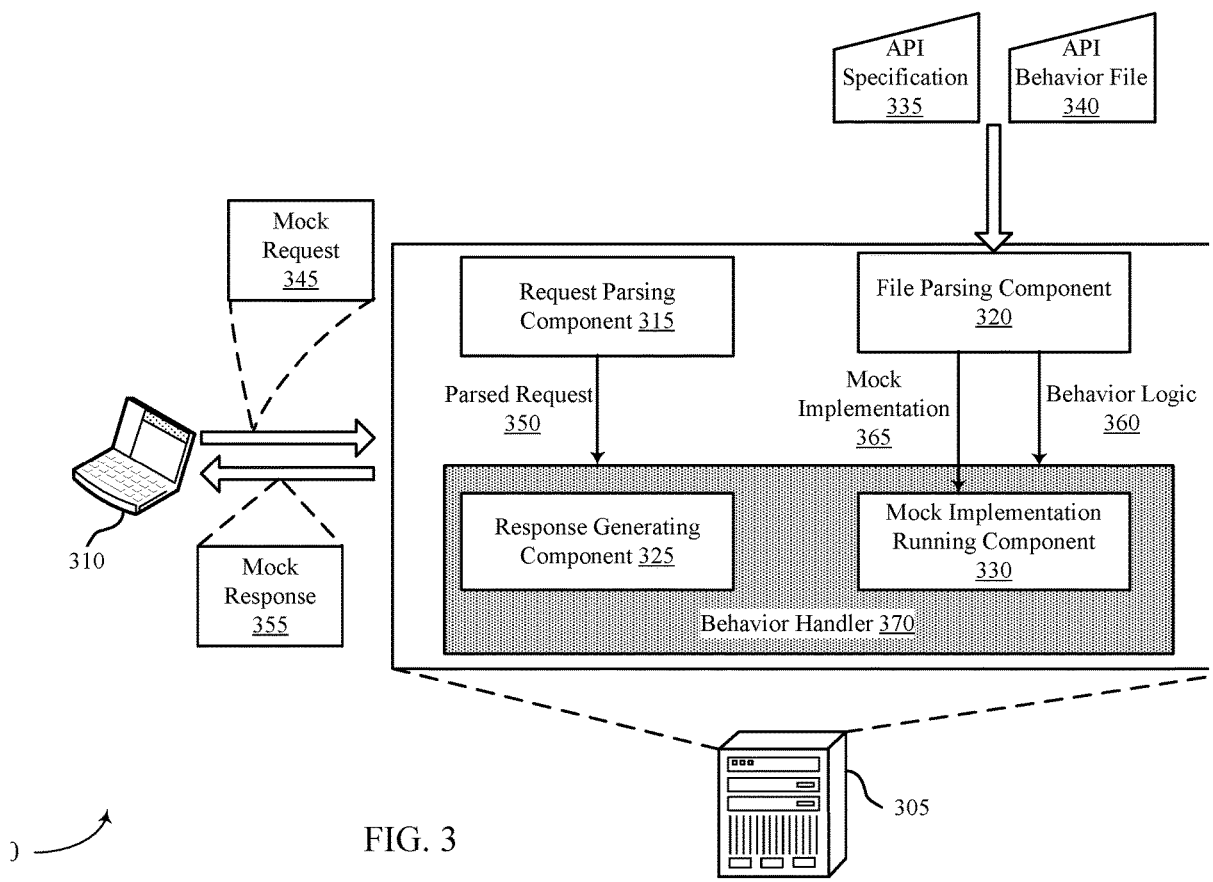
FIG. 3 illustrates an example of a system that supports designer defined mocking service behavior in accordance with aspects of the present disclosure.

FIG. 3 illustrates an example of a system 300 that supports designer defined mocking service behavior in accordance with aspects of the present disclosure. The mocking system 300 may include a server 305, which may be an example of a server 205 of FIG. 2. The server 305 may receive requests 345 from a user device 310 to generate and transmit mock responses 355 to the user device 310. The server 305 may include memory which stores and executes the mock implementation 365 based on a parsed model of an API specification, as described with respect to FIG. 2.

The user device 310, which may be an example of the device 210 of FIG. 2, may be the device that provided the API specification 335 or the indication of the API specification or may be another device with authenticated access to the mock implementation. A user may be configuring a tool or service for interacting with an API using the device 310. A service may include a user interface, backend service, client facing application, etc. that may transmit requests to and receive responses from an API that is being designed or prototyped via the API specification. Accordingly, the API specification 335 may define requestable resources and some functionality that may be included in the API.

The server 305 may include a file parsing component 320, which is configured for parsing an API specification 335 and an API behavior file 340. The file parsing component 320 may include separate logic for parsing the API specification 335 and for parsing the API behavior file 340. The logic for parsing the API specification 335 may be specific to an API modeling language (e.g., RAML) or may be configured for parsing multiple API modeling languages. The logic for parsing the API behavior file may consist of domain specific language (DSL) for parsing encoded API behaviors. The DSL may be generic for different API modeling languages.

As described herein, the file parsing component 320 may generate a parsed model, which is deployed and executed as a mock implementation 365 in memory of the server 305 (e.g., in a mock implementation running component 330). The file parsing component 320 may further generate behavior logic 360, which may translate to a behavior handler 370 encapsulating mock implementation running component 330 and response generating component 325, because the logic may refer to operations before, during, and after execution of the mock implementation 365.

The server 305 receives mock requests 345 from the user device 310, and the mock request 345 may comprise hypertext transfer protocol (HTTP) requests. The request may indicate a method and a resource defined by the API specification 335. A request parsing component 315 may parse the mock requests 345 to identify requested resources, as well as other information or parameters, including authentication information. The request parsing component 315 may generate a parsed request 350, which is passed to the mock implementation running component 330. Depending on the behaviors encoded in the API behavior file, the behavior handler 370 may intercept, modify, and/or verify the parsed request 350. For example, the API behavior file may include instructions for conditions based on information (e.g., URI parameters, query parameters, payload values) included in the request. Thus, based on the API behavior file 340, the behavior handler 370 may perform some operations on the parsed request 350 before the mock implementation running component 330 executes the instructions (e.g., parsed model) of the API specification 335.

The server 305 may further include a response generating component, which generates mock responses 355 based on execution of the mock implementation 365 by the mock implementation running component 330. Responses may include status codes, error codes, requested resources, as well as other information. The behavior handler 370 may modify and/or verify generated responses based on the behaviors encoded in the API behavior file 340. For example, the behavior handler 370 may utilize regular expressions to identify aspects of generated responses and modify the generates responses. This may be useful when a certain response is expected based on a request, but the operations for generating the response are not encoded in the API specification. Rather than encoding a placeholder response in the API specification, the API behavior file 340 may be configured to recognize a response (e.g., an empty response for example), modify the response to include placeholder information, and output the mock response 355 to the user device 310.

The API behavior file 340 may also define other behaviors of the mock implementation 365 based on the API specification 335. The API behavior file 340 may define global behaviors such as time delays, error rates, status codes, etc. The API behavior file 340 may also define resource specific behaviors. For example, a specific resource defined in the API specification 335 may be assigned a time delay or an error code when requested in a mock request 345. Thus, if the resource is requested, the behavior handler 370 may modify a generated response to include the assigned error code and/or may delay transmission of the response based on the time delay. Similarly, a fixed, random, or range defined time delay may be assigned to the API specification 335 by the API behavior file 340. Accordingly, a response 355 may be delayed by the behavior handler 370 based on the time delay. In another example, the API behavior file 340 may define a condition to be evaluated when a request is received. The condition may be a global condition or assigned to a specific resource defined in the API specification. For example, if a resource is requested, a condition may evaluate other parameters in the mock request 345 and return different resource data dependent on the condition. The condition may depend on URI parameters, query parameters, payload values, as well as other information associated with a mock request 345.

Because the API behavior file 340 defines API behaviors separate from the API specification 335, behaviors defined in the API behavior file 340 may be modified, the API behavior file 340 may be reparsed by the file parsing component 320 to generate the behavior logic 360 corresponding to the behavior handler 370. However, the file parsing component 320 may not have to reparse the API specification 335. Thus, the mock implementation 365 may be re-executed by the mock implementation running component 330 with different behaviors without reparsing the API specification 335.

Figure 4:
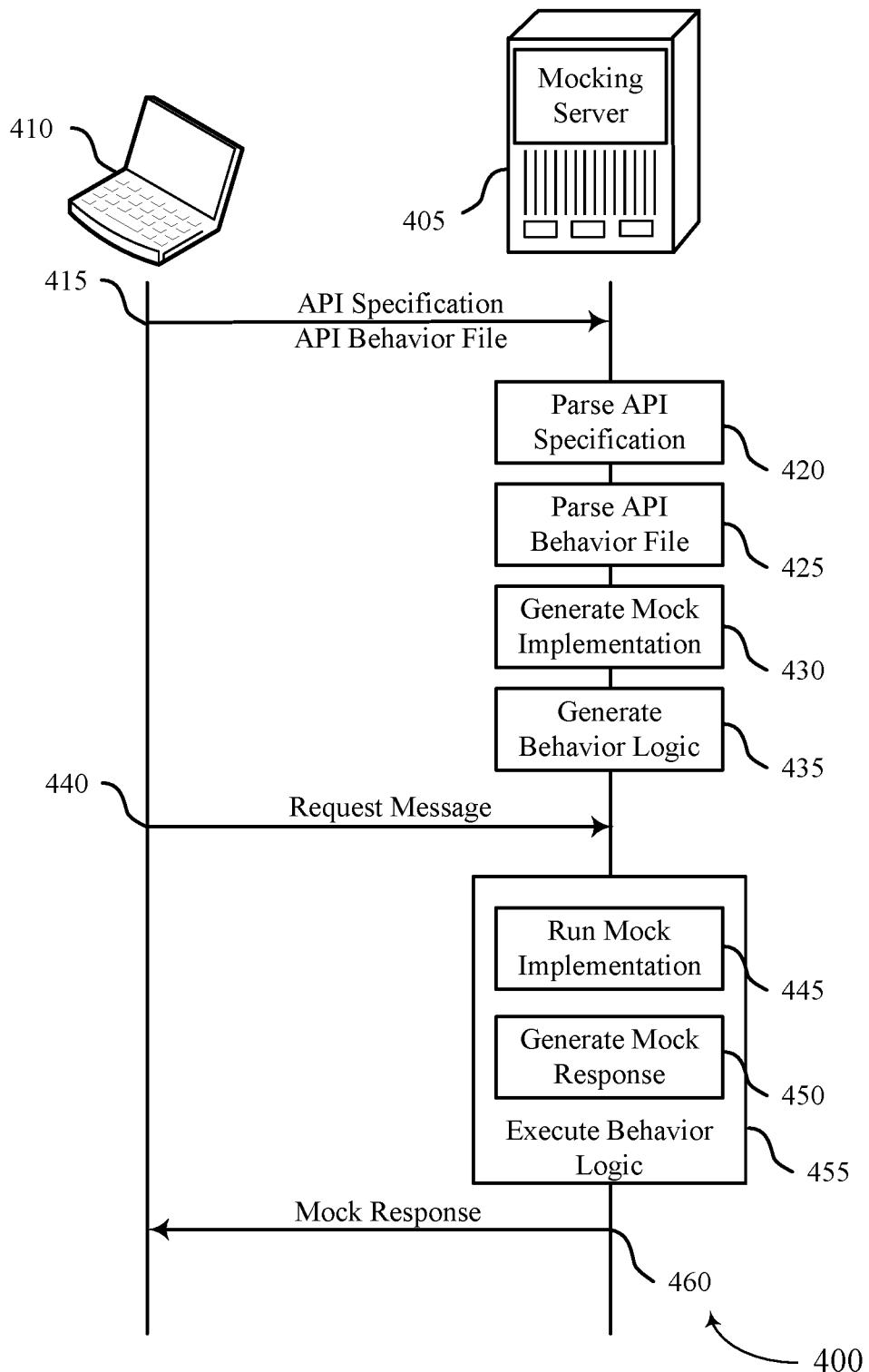
FIG. 4 illustrates an example of a flow diagram that illustrates designer defined mocking service behavior in accordance with aspects of the present disclosure.

FIG. 4 illustrates an example of a process flow 400 that illustrates designer defined mocking service behavior in accordance with aspects of the present disclosure. The process flow 400 may include a server 405 and a user device 410. The server 405 may be an example of a mocking server or a server 205 or 305 as described in FIGS. 2 and 3. The user device 410 may be an example of a user device 210 or a user device 310 as described in FIGS. 2 and 3. Alternative examples of the following may be implemented, where some steps are performed in a different order than described or are not performed at all. In some cases, steps may include additional features not mentioned below, or further steps may be added.

At 415, the server 405 may receive, from the user device 410, an identifier indicating an API specification for an API and an API behavior file corresponding to the API specification. The server 405 may identify a source for the API specification and API behavior file based on the identifier. The server 405 may retrieve the API specification and the API behavior file based on the identifier. The source of the API specification and the API behavior file may be an example of an internal repository of the server, an external repository, a shared code repository, a file upload, a memory storage at the server, or a cloud storage, or any other type of storage server or storage service.

At 420, the server 405 may parse, in memory of the server, the API specification, which is linked to the API behavior file. The API specification may be parsed to determine a parsed model for the API specification. In some cases, the API specification may be written in one of multiple different API specification languages, and the server 405 may be configured to parse any of the multiple API specification languages. The parsed model for the API specification may be an example of a mock model as described herein.

At 425, the server 405 may parse the API behavior file to generate behavior logic. The API behavior file may include MSL that is generic for different API specification languages. The behavior logic may include operations for processing requests transmitted to a mock implementation of the API specification and generating responses.

At 430, the server 425 generates a mock implementation of the API specification based on the parsed model for the API specification. In some cases, the server 405 may verify the parsed model based on generating the mock implementation of the API, where verifying determines whether the mock implementation is generated successfully. This may provide an opportunity for the server 405 to give feedback on the API specification or the parsed model, where the server 405 is configured to detect possible faults. Generating the mock implementation may include generating machine-readable code and storing the code in memory for execution of the mock implementation according to a received request, or the mock implementation may be persisted in memory for receiving requests and executing the mock implementation.

At 435, the server 405 generates behavior logic based on the parsed API behavior file. Generation of the behavior logic may include generating machine-readable code and storing the code in the memory of the server 404 for execution when requests are received and directed to the associated mock implementation.

At 440, the server 405 receives a request message to the mocking server 405. In some cases, the request message is transmitted by the user device 410 which transmitted the indication of the API specification. In other cases, the request message may be transmitted by a different user device 410 (e.g., the user device of another developer testing the API specification). The request message may include an identifier of the mock implementation or the API specification. The request may be an HTTP request and may include a URL of the mock implementation. The request may include an identification of a resource, a method, as well as other information.

At 455, responsive to receiving the request message, the server 405 executes behavior logic, which may encapsulate running of the mock implementation at 445, in which the mock implementation is run, in the memory of the server 405 according to the API behavior file. The behavior logic may modify or verify the request message or check a condition based on the request message. At 450, the server 405 generates a mock response according to the running of the mock implementation. The behavior logic may modify the mock response.

At 460, the server 405 returns the mock response to the user device 410 according to the API behavior file. In some cases, the server 405 may delay transmission of the mock response based on the API behavior file.

Figure 5:
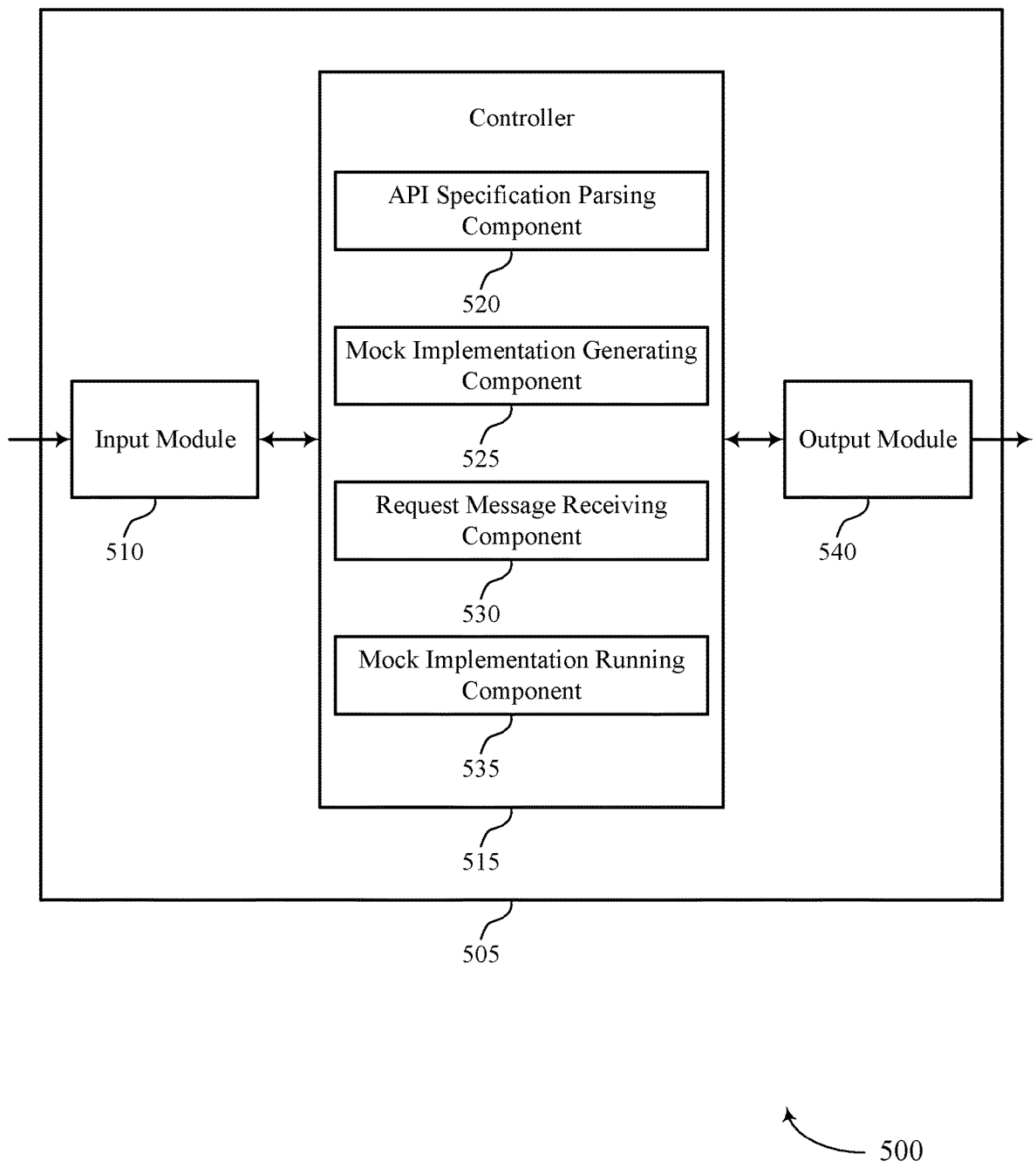
FIG. 5 shows a block diagram of an apparatus that supports designer defined mocking service behavior in accordance with aspects of the present disclosure.

FIG. 5 shows a block diagram 500 of an apparatus 505 that supports designer defined mocking service behavior in accordance with aspects of the present disclosure. The apparatus 505 may include an input module 510, a controller 515, and an output module 540. The apparatus 505 may also include a processor. Each of these components may be in communication with one another (e.g., via one or more buses). In some cases, the apparatus 505 may be an example of a user terminal, a database server, or a system containing multiple computing devices.

The input module 510 may manage input signals for the apparatus 505. For example, the input module 510 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the apparatus 505 for processing. For example, the input module 510 may transmit input signals to the controller 515 to support data retention handling for data object stores. In some cases, the input module 510 may be a component of an input/output (I/O) controller 715 as described with reference to FIG. 7.

The controller 515 may include an API specification parsing component 520, a mock implementation generating component 525, a request message receiving component 530, and a mock implementation running component 535. The controller 515 may be an example of aspects of the controller 605 or 710 described with reference to FIGS. 6 and 7.

The controller 515 and/or at least some of its various sub-components may be implemented in hardware, software executed by a processor, firmware, or any combination thereof. If implemented in software executed by a processor, the functions of the controller 515 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The controller 515 and/or at least some of its various sub-components may be physically located at various positions, including being distributed such that portions of functions are implemented at different physical locations by one or more physical devices. In some examples, the controller 515 and/or at least some of its various sub-components may be a separate and distinct component in accordance with various aspects of the present disclosure. In other examples, the controller 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The API specification parsing component 520 may parse, in memory of the server, an API specification for an API to determine a parsed model for the API specification, an API behavior file being linked to the API specification. The mock implementation generating component 525 may generate a mock implementation of the API based on the parsed model for the API specification. The request message receiving component 530 may receive, from a user device, a request message indicating the mock implementation of the API. The mock implementation running component 535 may run, in the memory of the server, the mock implementation of the API and returning a response to the request message to the user device according to the API behavior file.

The output module 540 may manage output signals for the apparatus 505. For example, the output module 540 may receive signals from other components of the apparatus 505, such as the controller 515, and may transmit these signals to other components or devices. In some specific examples, the output module 540 may transmit output signals for display in a user interface, for storage in a database or data store, for further processing at a server or server cluster, or for any other processes at any number of devices or systems. In some cases, the output module 540 may be a component of an I/O controller 715 as described with reference to FIG. 7.

Figure 6:
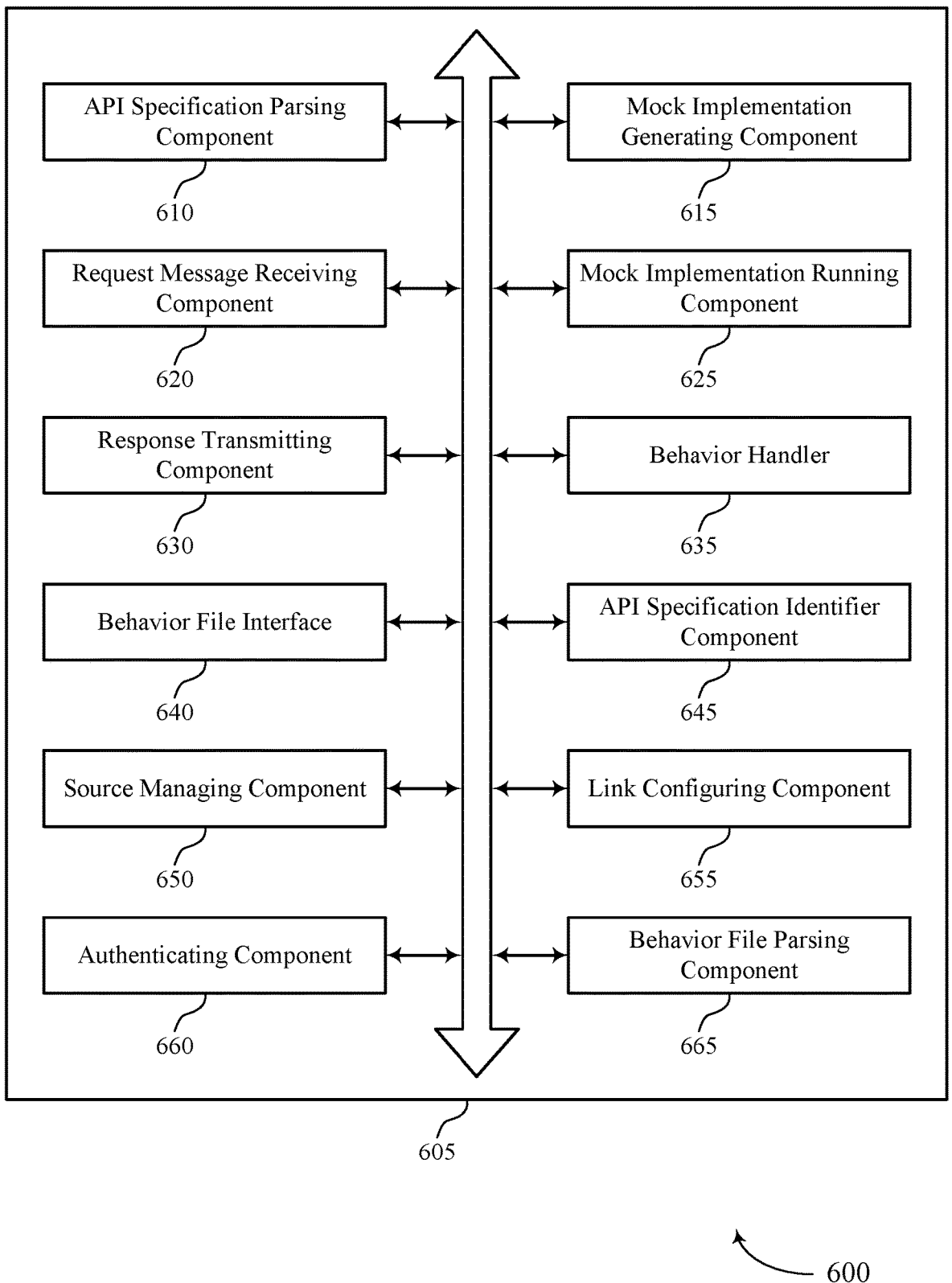
FIG. 6 shows a block diagram of a controller that supports designer defined mocking service behavior in accordance with aspects of the present disclosure.

FIG. 6 shows a block diagram 600 of a controller 605 that supports designer defined mocking service behavior in accordance with aspects of the present disclosure. The controller 605 may be an example of aspects of a controller 515 or a controller 710 described herein. The controller 605 may include an API specification parsing component 610, a mock implementation generating component 615, a request message receiving component 620, a mock implementation running component 625, a response transmitting component 630, a behavior handler 635, a behavior file interface 640, an API specification identifier component 645, a source managing component 650, a link configuring component 655, an authenticating component 660, and a behavior file parsing component 665. Each of these modules may communicate, directly or indirectly, with one another (e.g., via one or more buses).

The API specification parsing component 610 may parse, in memory of the server, an API specification for an API to determine a parsed model for the API specification, an API behavior file being linked to the API specification. The mock implementation generating component 615 may generate a mock implementation of the API based on the parsed model for the API specification. The request message receiving component 620 may receive, from a user device, a request message indicating the mock implementation of the API. The mock implementation running component 625 may run, in the memory of the server, the mock implementation of the API and returning a response to the request message to the user device according to the API behavior file.

The response transmitting component 630 may return the response to a requested resource to the user device according to the API behavior file, where the request message indicates the requested resource of the API specification. In some examples, the response transmitting component 630 may return the response to a requested resource according to a behavior corresponding to the requested resource defined in the API behavior file, where the request message indicates the requested resource of the API specification. In some examples, the response transmitting component 630 may return the response to the requested resource after a time period defined by a time delay, where the API behavior file defines the time delay corresponding to the requested resource in the API specification. In some examples, the response transmitting component 630 may return the response to the requested resource according to the evaluated condition.

In some examples, the response transmitting component 630 may return the response to the request message without regenerating the mock implementation of the API and according to the modified API behavior file. In some examples, the response transmitting component 630 may return the response to a requested resource according to a response override, where the request message indicates the requested resource of the API specification, where the API behavior file defines the response override corresponding to the requested resource of the API specification. In some examples, the response transmitting component 630 may return the modified response to the requested resource.

The behavior handler 635 may evaluate a condition defined in the API behavior file corresponding to a requested resource, where the API behavior file defines the condition corresponding to the requested resource of the API specification. In some examples, the behavior handler 635 may modify a generated response according to the response override, where running the mock implementation of the API generates the response to the request message. In some cases, the condition depends on a parameter included in the request message. In some cases, the API behavior file specifies a fixed delay simulation, a variable delay simulation, an error rate, an error level, or a combination thereof.

The behavior file interface 640 may detect a modification of the API behavior file. The API specification identifier component 645 may receive, from a second user device, an identifier indicating the API specification for the API. In some examples, the API specification identifier component 645 may retrieve the API specification based on the identifier. The source managing component 650 may identify a source for retrieving the API specification based on the identifier. The link configuring component 655 may generate a link to the mock implementation of the API, the link configured to be shared to the user device. In some examples, the link configuring component 655 may receive the request message indicating the mock implementation based on the generated link.

The authenticating component 660 may authenticate the request message based on a permission level associated with the user device prior to running the mock implementation of the API. The behavior file parsing component 665 may parse the behavior file to identify one or more behaviors encoded in the behavior files, where the mock implementation is run according to the one or more behaviors and the response is transmitted according to the one or more behaviors.

Figure 7:
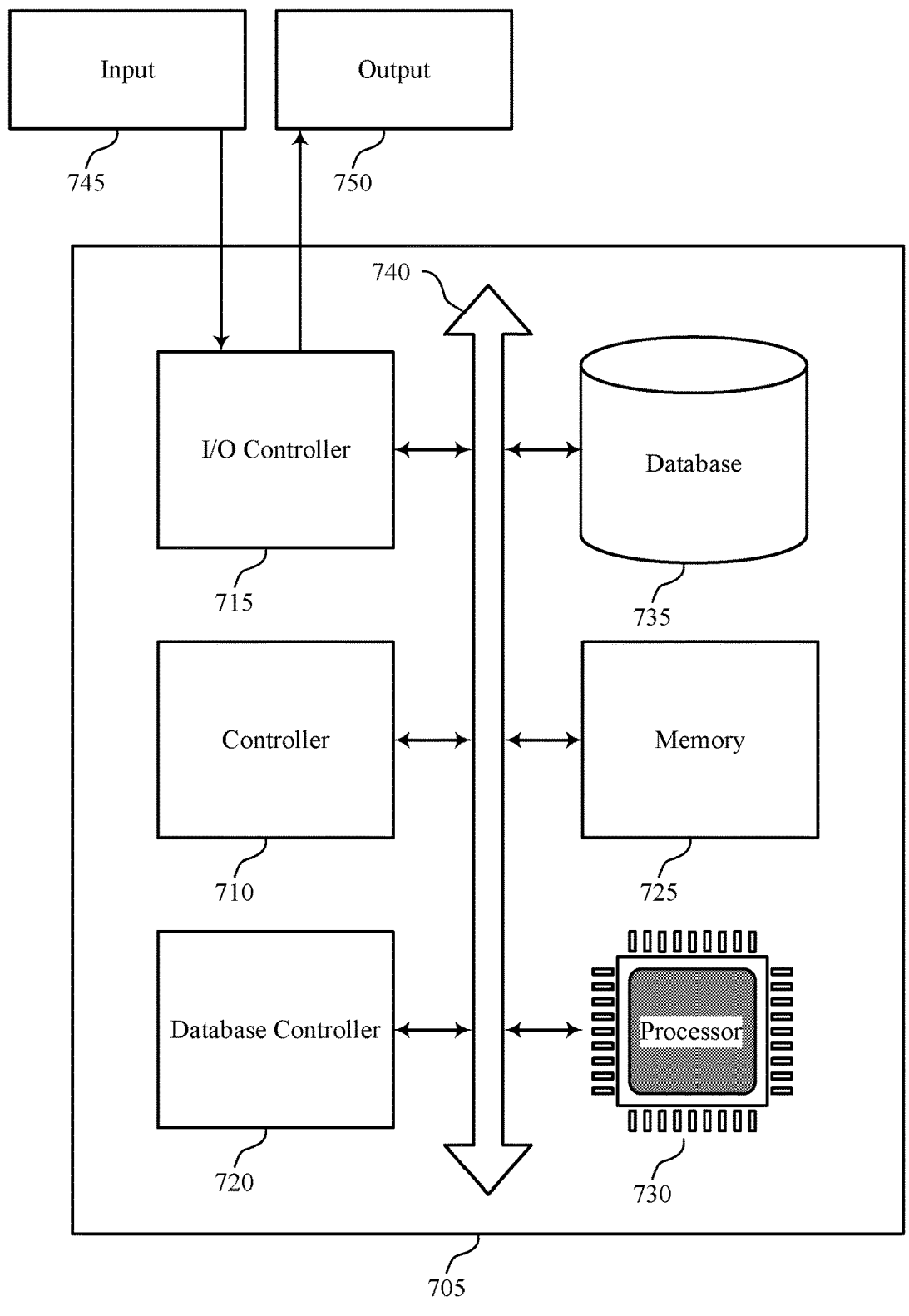
FIG. 7 shows a diagram of a system including a device that supports designer defined mocking service behavior in accordance with aspects of the present disclosure.

FIG. 7 shows a diagram of a system 700 including a device 705 that supports designer defined mocking service behavior in accordance with aspects of the present disclosure. The device 705 may be an example of or include the components of an application server or an apparatus 505 as described herein. The device 705 may include components for bi-directional data communications including components for transmitting and receiving communications, including a controller 710, an I/O controller 715, a database controller 720, memory 725, a processor 730, and a database 735. These components may be in electronic communication via one or more buses (e.g., bus 740).

The controller 710 may be an example of a controller 515 or 605 as described herein. For example, the controller 710 may perform any of the methods or processes described herein with reference to FIGS. 5 and 6. In some cases, the controller 710 may be implemented in hardware, software executed by a processor, firmware, or any combination thereof.

The I/O controller 715 may manage input signals 745 and output signals 750 for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The database controller 720 may manage data storage and processing in a database 735. In some cases, a user may interact with the database controller 720. In other cases, the database controller 720 may operate automatically without user interaction. The database 735 may be an example of a single database, a distributed database, multiple distributed databases, a data store, a data lake, or an emergency backup database.

Memory 725 may include random-access memory (RAM) and read-only memory (ROM). The memory 725 may store computer-readable, computer-executable software including instructions that, when executed, cause the processor to perform various functions described herein. In some cases, the memory 725 may contain, among other things, a basic input/output system (BIOS) which may control basic hardware or software operation such as the interaction with peripheral components or devices.

The processor 730 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting designer defined mocking service behavior).

Figure 8:
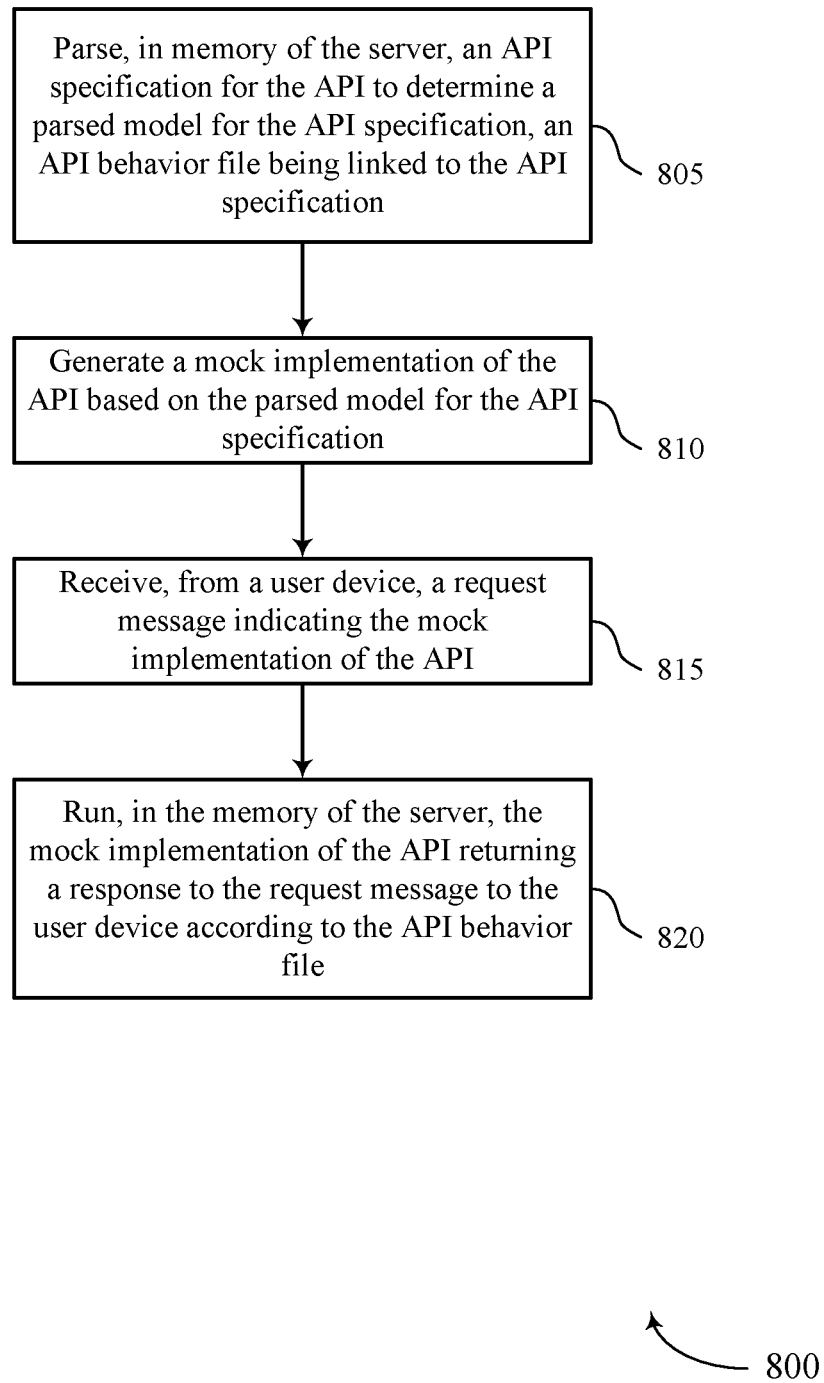
FIGS. 8 through 12 show flowcharts illustrating methods that support designer defined mocking service behavior in accordance with aspects of the present disclosure.

FIG. 8 shows a flowchart illustrating a method 800 that supports designer defined mocking service behavior in accordance with aspects of the present disclosure. The operations of method 800 may be implemented by an application server or its components as described herein. For example, the operations of method 800 may be performed by a controller as described with reference to FIGS. 5 through 7. In some examples, an application server may execute a set of instructions to control the functional elements of the application server to perform the functions described herein. Additionally or alternatively, an application server may perform aspects of the functions described herein using special-purpose hardware.

At 805, the application server may parse, in memory of the server, an API specification for an API to determine a parsed model for the API specification, an API behavior file being linked to the API specification. The operations of 805 may be performed according to the methods described herein. In some examples, aspects of the operations of 805 may be performed by an API specification parsing component as described with reference to FIGS. 5 through 7.

At 810, the application server may generate a mock implementation of the API based on the parsed model for the API specification. The operations of 810 may be performed according to the methods described herein. In some examples, aspects of the operations of 810 may be performed by a mock implementation generating component as described with reference to FIGS. 5 through 7.

At 815, the application server may receive, from a user device, a request message indicating the mock implementation of the API. The operations of 815 may be performed according to the methods described herein. In some examples, aspects of the operations of 815 may be performed by a request message receiving component as described with reference to FIGS. 5 through 7.

At 820, the application server may run, in the memory of the server, the mock implementation of the API and returning a response to the request message to the user device according to the API behavior file. The operations of 820 may be performed according to the methods described herein. In some examples, aspects of the operations of 820 may be performed by a mock implementation running component as described with reference to FIGS. 5 through 7.

Figure 9:
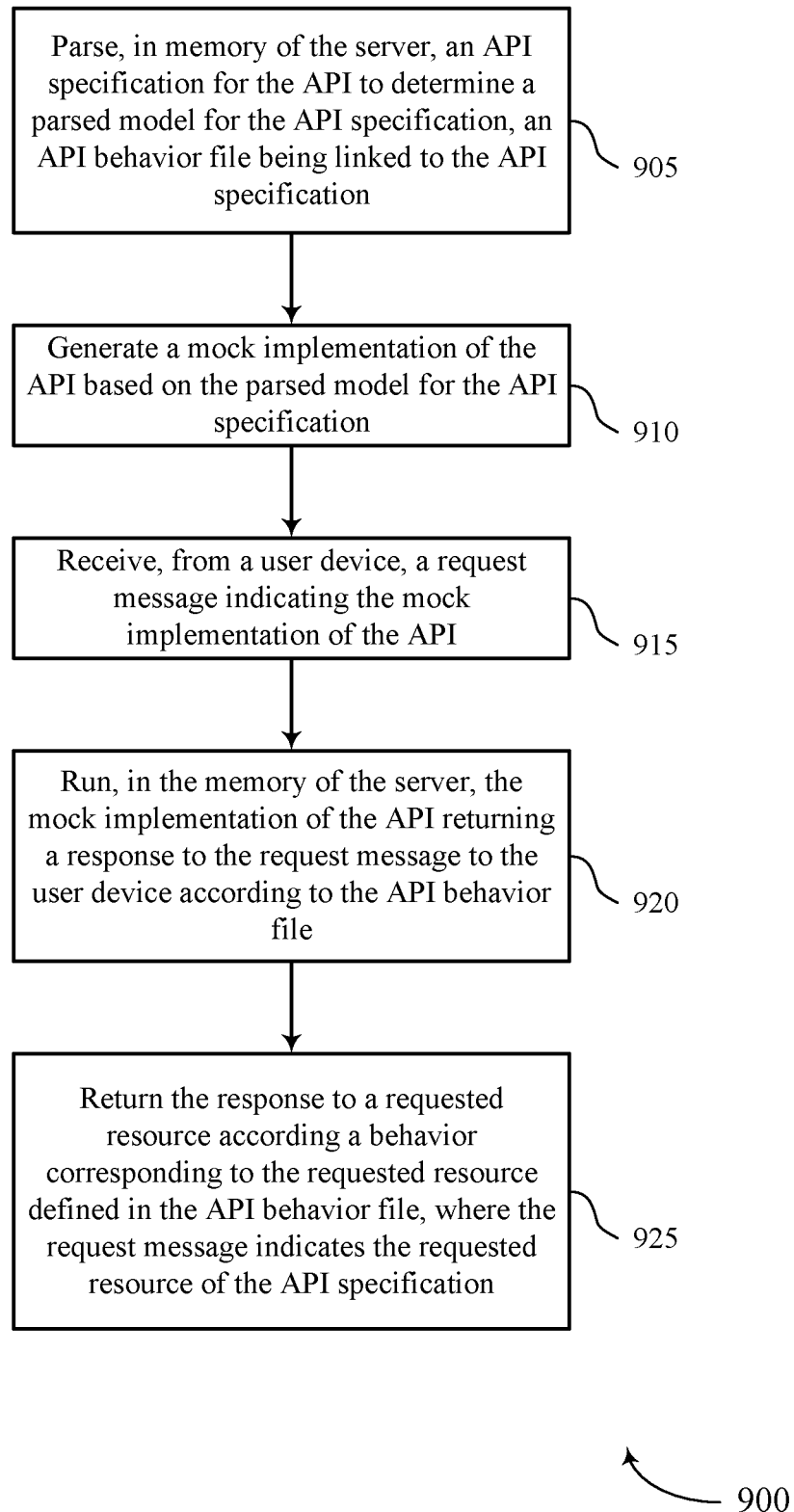

FIG. 9 shows a flowchart illustrating a method 900 that supports designer defined mocking service behavior in accordance with aspects of the present disclosure. The operations of method 900 may be implemented by an application server or its components as described herein. For example, the operations of method 900 may be performed by a controller as described with reference to FIGS. 5 through 7. In some examples, an application server may execute a set of instructions to control the functional elements of the application server to perform the functions described herein. Additionally or alternatively, an application server may perform aspects of the functions described herein using special-purpose hardware.

At 905, the application server may parse, in memory of the server, an API specification for an API to determine a parsed model for the API specification, an API behavior file being linked to the API specification. The operations of 905 may be performed according to the methods described herein. In some examples, aspects of the operations of 905 may be performed by an API specification parsing component as described with reference to FIGS. 5 through 7.

At 910, the application server may generate a mock implementation of the API based on the parsed model for the API specification. The operations of 910 may be performed according to the methods described herein. In some examples, aspects of the operations of 910 may be performed by a mock implementation generating component as described with reference to FIGS. 5 through 7.

At 915, the application server may receive, from a user device, a request message indicating the mock implementation of the API. The operations of 915 may be performed according to the methods described herein. In some examples, aspects of the operations of 915 may be performed by a request message receiving component as described with reference to FIGS. 5 through 7.

At 920, the application server may run, in the memory of the server, the mock implementation of the API and returning a response to the request message to the user device according to the API behavior file. The operations of 920 may be performed according to the methods described herein. In some examples, aspects of the operations of 920 may be performed by a mock implementation running component as described with reference to FIGS. 5 through 7.

At 925, the application server may return the response to a requested resource according to a behavior corresponding to the requested resource defined in the API behavior file, where the request message indicates the requested resource of the API specification. The operations of 925 may be performed according to the methods described herein. In some examples, aspects of the operations of 925 may be performed by a response transmitting component as described with reference to FIGS. 5 through 7.

Figure 10:
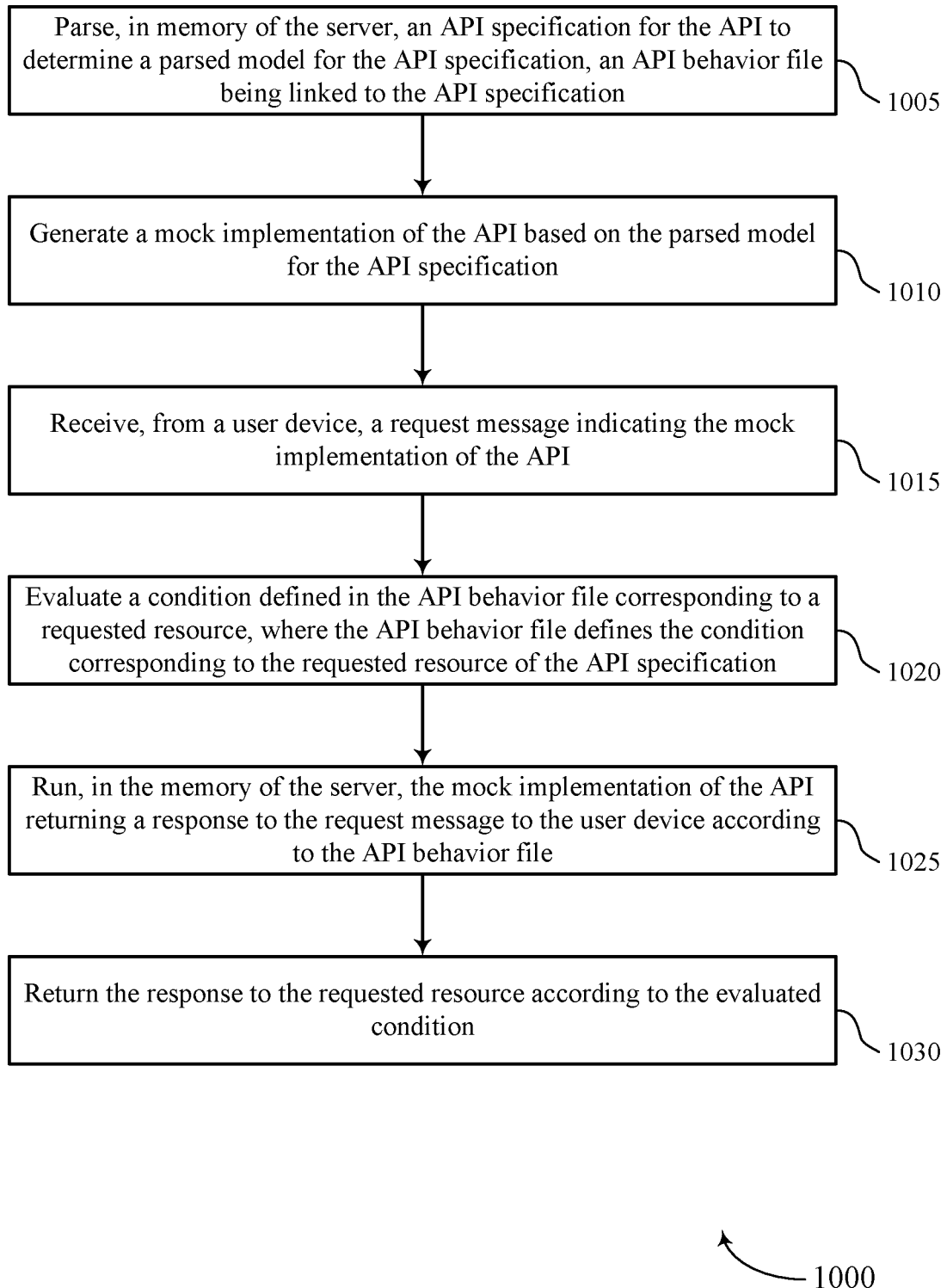

FIG. 10 shows a flowchart illustrating a method 1000 that supports designer defined mocking service behavior in accordance with aspects of the present disclosure. The operations of method 1000 may be implemented by an application server or its components as described herein. For example, the operations of method 1000 may be performed by a controller as described with reference to FIGS. 5 through 7. In some examples, an application server may execute a set of instructions to control the functional elements of the application server to perform the functions described herein. Additionally or alternatively, an application server may perform aspects of the functions described herein using special-purpose hardware.

At 1005, the application server may parse, in memory of the server, an API specification for an API to determine a parsed model for the API specification, an API behavior file being linked to the API specification. The operations of 1005 may be performed according to the methods described herein. In some examples, aspects of the operations of 1005 may be performed by an API specification parsing component as described with reference to FIGS. 5 through 7.

At 1010, the application server may generate a mock implementation of the API based on the parsed model for the API specification. The operations of 1010 may be performed according to the methods described herein. In some examples, aspects of the operations of 1010 may be performed by a mock implementation generating component as described with reference to FIGS. 5 through 7.

At 1015, the application server may receive, from a user device, a request message indicating the mock implementation of the API. The operations of 1015 may be performed according to the methods described herein. In some examples, aspects of the operations of 1015 may be performed by a request message receiving component as described with reference to FIGS. 5 through 7.

At 1020, the application server may evaluate a condition defined in the API behavior file corresponding to a requested resource, where the API behavior file defines the condition corresponding to the requested resource of the API specification. The operations of 1020 may be performed according to the methods described herein. In some examples, aspects of the operations of 1020 may be performed by a behavior handler as described with reference to FIGS. 5 through 7.

At 1025, the application server may run, in the memory of the server, the mock implementation of the API and returning a response to the request message to the user device according to the API behavior file. The operations of 1025 may be performed according to the methods described herein. In some examples, aspects of the operations of 1025 may be performed by a mock implementation running component as described with reference to FIGS. 5 through 7.

At 1030, the application server may return the response to the requested resource according to the evaluated condition. The operations of 1030 may be performed according to the methods described herein. In some examples, aspects of the operations of 1030 may be performed by a response transmitting component as described with reference to FIGS. 5 through 7.

Figure 11:
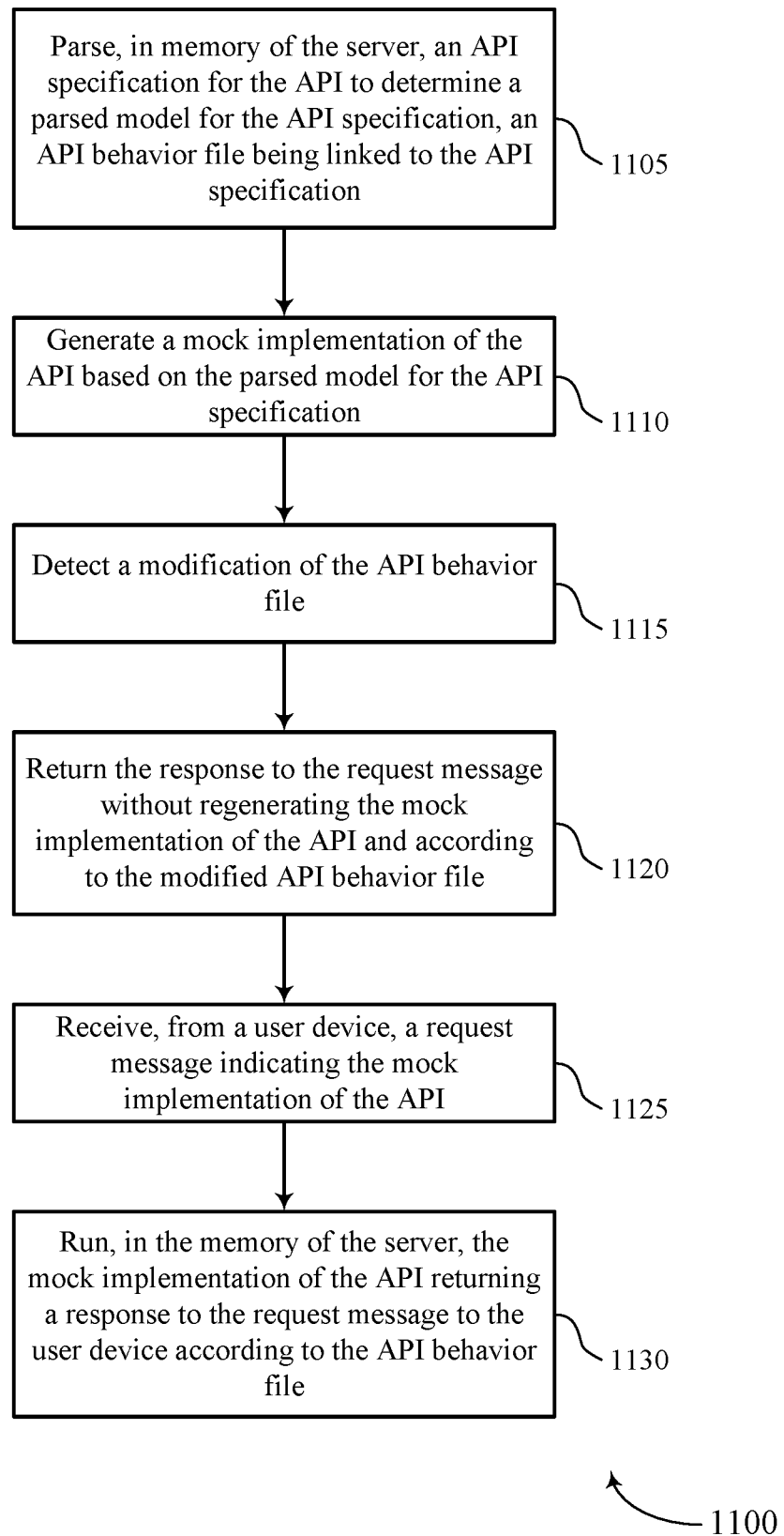

FIG. 11 shows a flowchart illustrating a method 1100 that supports designer defined mocking service behavior in accordance with aspects of the present disclosure. The operations of method 1100 may be implemented by an application server or its components as described herein. For example, the operations of method 1100 may be performed by a controller as described with reference to FIGS. 5 through 7. In some examples, an application server may execute a set of instructions to control the functional elements of the application server to perform the functions described herein. Additionally or alternatively, an application server may perform aspects of the functions described herein using special-purpose hardware.

At 1105, the application server may parse, in memory of the server, an API specification for an API to determine a parsed model for the API specification, an API behavior file being linked to the API specification. The operations of 1105 may be performed according to the methods described herein. In some examples, aspects of the operations of 1105 may be performed by an API specification parsing component as described with reference to FIGS. 5 through 7.

At 1110, the application server may generate a mock implementation of the API based on the parsed model for the API specification. The operations of 1110 may be performed according to the methods described herein. In some examples, aspects of the operations of 1110 may be performed by a mock implementation generating component as described with reference to FIGS. 5 through 7.

At 1115, the application server may detect a modification of the API behavior file. The operations of 1115 may be performed according to the methods described herein. In some examples, aspects of the operations of 1115 may be performed by a behavior file interface as described with reference to FIGS. 5 through 7.

At 1120, the application server may return the response to the request message without regenerating the mock implementation of the API and according to the modified API behavior file. The operations of 1120 may be performed according to the methods described herein. In some examples, aspects of the operations of 1120 may be performed by a response transmitting component as described with reference to FIGS. 5 through 7.

At 1125, the application server may receive, from a user device, a request message indicating the mock implementation of the API. The operations of 1125 may be performed according to the methods described herein. In some examples, aspects of the operations of 1125 may be performed by a request message receiving component as described with reference to FIGS. 5 through 7.

At 1130, the application server may run, in the memory of the server, the mock implementation of the API and returning a response to the request message to the user device according to the API behavior file. The operations of 1130 may be performed according to the methods described herein. In some examples, aspects of the operations of 1130 may be performed by a mock implementation running component as described with reference to FIGS. 5 through 7.

Figure 12:
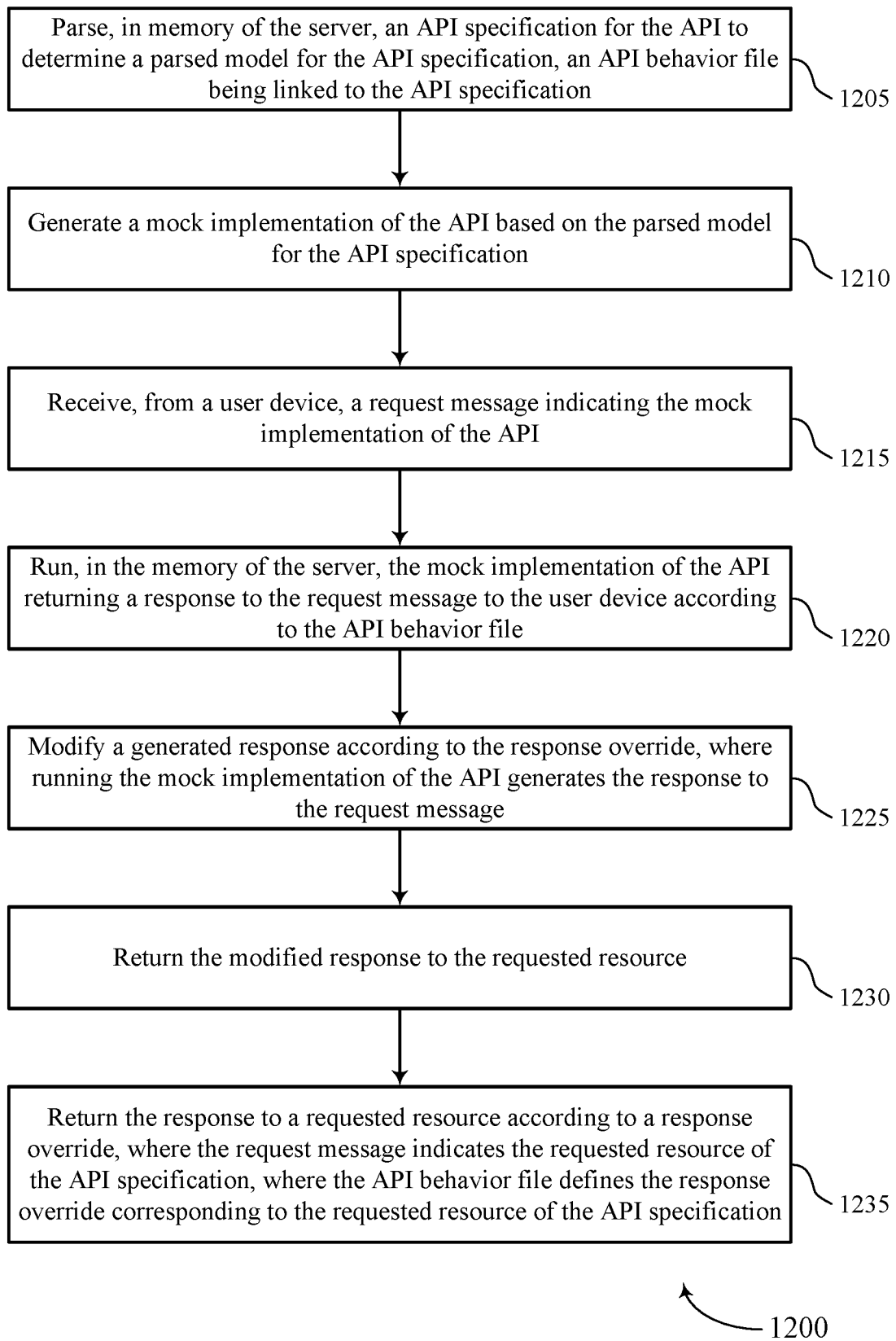

FIG. 12 shows a flowchart illustrating a method 1200 that supports designer defined mocking service behavior in accordance with aspects of the present disclosure. The operations of method 1200 may be implemented by an application server or its components as described herein. For example, the operations of method 1200 may be performed by a controller as described with reference to FIGS. 5 through 7. In some examples, an application server may execute a set of instructions to control the functional elements of the application server to perform the functions described herein. Additionally or alternatively, an application server may perform aspects of the functions described herein using special-purpose hardware.

At 1205, the application server may parse, in memory of the server, an API specification for an API to determine a parsed model for the API specification, an API behavior file being linked to the API specification. The operations of 1205 may be performed according to the methods described herein. In some examples, aspects of the operations of 1205 may be performed by an API specification parsing component as described with reference to FIGS. 5 through 7.

At 1210, the application server may generate a mock implementation of the API based on the parsed model for the API specification. The operations of 1210 may be performed according to the methods described herein. In some examples, aspects of the operations of 1210 may be performed by a mock implementation generating component as described with reference to FIGS. 5 through 7.

At 1215, the application server may receive, from a user device, a request message indicating the mock implementation of the API. The operations of 1215 may be performed according to the methods described herein. In some examples, aspects of the operations of 1215 may be performed by a request message receiving component as described with reference to FIGS. 5 through 7.

At 1220, the application server may run, in the memory of the server, the mock implementation of the API and returning a response to the request message to the user device according to the API behavior file. The operations of 1220 may be performed according to the methods described herein. In some examples, aspects of the operations of 1220 may be performed by a mock implementation running component as described with reference to FIGS. 5 through 7.

At 1225, the application server may modify a generated response according to the response override, where running the mock implementation of the API generates the response to the request message. The operations of 1225 may be performed according to the methods described herein. In some examples, aspects of the operations of 1225 may be performed by a behavior handler as described with reference to FIGS. 5 through 7.

At 1230, the application server may return the modified response to the requested resource. The operations of 1230 may be performed according to the methods described herein. In some examples, aspects of the operations of 1230 may be performed by a response transmitting component as described with reference to FIGS. 5 through 7.

At 1235, the application server may return the response to a requested resource according to a response override, where the request message indicates the requested resource of the API specification, where the API behavior file defines the response override corresponding to the requested resource of the API specification. The operations of 1235 may be performed according to the methods described herein. In some examples, aspects of the operations of 1235 may be performed by a response transmitting component as described with reference to FIGS. 5 through 7.

A method of testing an application programming interface (API) at a server is described. The method may include parsing, in memory of the server, an API specification for the API to determine a parsed model for the API specification, an API behavior file being linked to the API specification, generating a mock implementation of the API based on the parsed model for the API specification, receiving, from a user device, a request message indicating the mock implementation of the API, and running, in the memory of the server, the mock implementation of the API and returning a response to the request message to the user device according to the API behavior file.

An apparatus for testing an application programming interface (API) at a server is described. The apparatus may include a processor, memory in electronic communication with the processor, and instructions stored in the memory. The instructions may be executable by the processor to cause the apparatus to parse, in memory of the server, an API specification for the API to determine a parsed model for the API specification, an API behavior file being linked to the API specification, generate a mock implementation of the API based on the parsed model for the API specification, receive, from a user device, a request message indicating the mock implementation of the API, and run, in the memory of the server, the mock implementation of the API and returning a response to the request message to the user device according to the API behavior file.

Another apparatus for testing an application programming interface (API) at a server is described. The apparatus may include means for parsing, in memory of the server, an API specification for the API to determine a parsed model for the API specification, an API behavior file being linked to the API specification, generating a mock implementation of the API based on the parsed model for the API specification, receiving, from a user device, a request message indicating the mock implementation of the API, and running, in the memory of the server, the mock implementation of the API and returning a response to the request message to the user device according to the API behavior file.

A non-transitory computer-readable medium storing code for testing an application programming interface (API) at a server is described. The code may include instructions executable by a processor to parse, in memory of the server, an API specification for the API to determine a parsed model for the API specification, an API behavior file being linked to the API specification, generate a mock implementation of the API based on the parsed model for the API specification, receive, from a user device, a request message indicating the mock implementation of the API, and run, in the memory of the server, the mock implementation of the API and returning a response to the request message to the user device according to the API behavior file.

Some examples of the method, apparatuses, and non-transitory computer-readable medium described herein may further include operations, features, means, or instructions for returning the response to a requested resource to the user device according to the API behavior file, where the request message indicates the requested resource of the API specification.

Some examples of the method, apparatuses, and non-transitory computer-readable medium described herein may further include operations, features, means, or instructions for returning the response to a requested resource according to a behavior corresponding to the requested resource defined in the API behavior file, where the request message indicates the requested resource of the API specification.

Some examples of the method, apparatuses, and non-transitory computer-readable medium described herein may further include operations, features, means, or instructions for returning the response to the requested resource after a time period defined by a time delay, where the API behavior file defines the time delay corresponding to the requested resource in the API specification.

Some examples of the method, apparatuses, and non-transitory computer-readable medium described herein may further include operations, features, means, or instructions for evaluating a condition defined in the API behavior file corresponding to a requested resource, where the API behavior file defines the condition corresponding to the requested resource of the API specification, and returning the response to the requested resource according to the evaluated condition.

In some examples of the method, apparatuses, and non-transitory computer-readable medium described herein, the condition depends on a parameter included in the request message.

Some examples of the method, apparatuses, and non-transitory computer-readable medium described herein may further include operations, features, means, or instructions for detecting a modification of the API behavior file, and returning the response to the request message without regenerating the mock implementation of the API and according to the modified API behavior file.

Some examples of the method, apparatuses, and non-transitory computer-readable medium described herein may further include operations, features, means, or instructions for returning the response to a requested resource according to a response override, where the request message indicates the requested resource of the API specification, where the API behavior file defines the response override corresponding to the requested resource of the API specification.

Some examples of the method, apparatuses, and non-transitory computer-readable medium described herein may further include operations, features, means, or instructions for modifying a generated response according to the response override, where running the mock implementation of the API generates the response to the request message, and returning the modified response to the requested resource.

In some examples of the method, apparatuses, and non-transitory computer-readable medium described herein, the API behavior file specifies a fixed delay simulation, a variable delay simulation, an error rate, an error level, or a combination thereof.

In some examples of the method, apparatuses, and non-transitory computer-readable medium described herein, the mock implementation of the API may be run in the memory of the server and generated without accessing a database.

In some examples of the method, apparatuses, and non-transitory computer-readable medium described herein, the mock implementation for the API may be generated based on metadata of the API specification.

Some examples of the method, apparatuses, and non-transitory computer-readable medium described herein may further include operations, features, means, or instructions for receiving, from a second user device, an identifier indicating the API specification for the API, and retrieving the API specification based on the identifier.

Some examples of the method, apparatuses, and non-transitory computer-readable medium described herein may further include operations, features, means, or instructions for identifying a source for retrieving the API specification based on the identifier.

In some examples of the method, apparatuses, and non-transitory computer-readable medium described herein, the source for retrieving the API specification may be an internal repository of the server, an external repository, a shared code repository, a file upload, a memory storage at the server, or a cloud storage.

Some examples of the method, apparatuses, and non-transitory computer-readable medium described herein may further include operations, features, means, or instructions for generating a link to the mock implementation of the API, the link configured to be shared to the user device, and receiving the request message indicating the mock implementation based on the generated link.

Some examples of the method, apparatuses, and non-transitory computer-readable medium described herein may further include operations, features, means, or instructions for authenticating the request message based on a permission level associated with the user device prior to running the mock implementation of the API.

Some examples of the method, apparatuses, and non-transitory computer-readable medium described herein may further include operations, features, means, or instructions for parsing the behavior file to identify one or more behaviors encoded in the behavior files, where the mock implementation may be run according to the one or more behaviors and the response may be transmitted according to the one or more behaviors.

It should be noted that the methods described herein describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for testing an application programming interface (API) at a server, comprising:
    parsing, in memory of the server, an API specification for the API to determine a parsed model for the API specification, an API behavior file being linked to the API specification;
    generating a mock implementation of the API based at least in part on the parsed model for the API specification;
    running, in the memory of the server, the mock implementation of the API;
    detecting, at the server, a modification of the API behavior file;
    receiving, from a user device, a request message indicating the mock implementation of the API; and
    returning a response to the request message to the user device according to the modified API behavior file and the mock implementation of the API that is maintained in the memory of the server after the API behavior file is modified.

2. The method of claim 1, further comprising:
    returning the response to a requested resource to the user device according to the API behavior file, wherein the request message indicates the requested resource of the API specification.

3. The method of claim 1, further comprising:
    returning the response to a requested resource according to a behavior corresponding to the requested resource defined in the API behavior file, wherein the request message indicates the requested resource of the API specification.

4. The method of claim 3, further comprising:
    returning the response to the requested resource after a time period defined by a time delay, wherein the API behavior file defines the time delay corresponding to the requested resource in the API specification.

5. The method of claim 1, further comprising:
    evaluating a condition defined in the API behavior file corresponding to a requested resource, wherein the API behavior file defines the condition corresponding to the requested resource of the API specification; and
    returning the response to the requested resource according to the evaluated condition.

6. The method of claim 5, wherein the condition depends on a parameter included in the request message.

7. The method of claim 1, further comprising:
    returning the response to a requested resource according to a response override, wherein the request message indicates the requested resource of the API specification, wherein the API behavior file defines the response override corresponding to the requested resource of the API specification.

8. The method of claim 7, further comprising:
modifying a generated response according to the response override, wherein running the mock implementation of the API generates the response to the request message; and
returning the modified response to the requested resource.

9. The method of claim 1, wherein the API behavior file specifies a fixed delay simulation, a variable delay simulation, an error rate, an error level, or a combination thereof.

10. The method of claim 1, wherein the mock implementation of the API is run in the memory of the server and generated without accessing a database.

11. The method of claim 1, wherein the mock implementation for the API is generated based at least in part on metadata of the API specification.

12. The method of claim 1, further comprising:
receiving, from a second user device, an identifier indicating the API specification for the API; and
retrieving the API specification based at least in part on the identifier.

13. The method of claim 12, further comprising:
identifying a source for retrieving the API specification based at least in part on the identifier.

14. The method of claim 13, wherein the source for retrieving the API specification is an internal repository of the server, an external repository, a shared code repository, a file upload, a memory storage at the server, or a cloud storage.

15. The method of claim 12, further comprising:
generating a link to the mock implementation of the API, the link configured to be shared to the user device; and
receiving the request message indicating the mock implementation based at least in part on the generated link.

16. The method of claim 1, further comprising:
authenticating the request message based at least in part on a permission level associated with the user device prior to running the mock implementation of the API.

17. The method of claim 1, further comprising:
parsing the API behavior file to identify one or more behaviors encoded in the API behavior file, wherein the mock implementation is run according to the one or more behaviors and the response is transmitted according to the one or more behaviors.

18. An apparatus for testing an application programming interface (API) at a server, comprising: a processor, memory in electronic communication with the processor; and instructions stored in the memory and executable by the processor to cause the apparatus to:
parse, in memory of the server, an API specification for the API to determine a parsed model for the API specification, an API behavior file being linked to the API specification;
generate a mock implementation of the API based at least in part on the parsed model for the API specification;
run, in the memory of the server, the mock implementation of the API;
detect, at the server, a modification of the API behavior file;
receive, from a user device, a request message indicating the mock implementation of the API; and
return a response to the request message to the user device according to the modified API behavior file and the mock implementation of the API that is maintained in the memory of the server after the API behavior file is modified.

19. A non-transitory computer-readable medium storing code for testing an application programming interface (API) at a server, the code comprising instructions executable by a processor to:
parse, in memory of the server, an API specification for the API to determine a parsed model for the API specification, an API behavior file being linked to the API specification;
generate a mock implementation of the API based at least in part on the parsed model for the API specification;
run, in the memory of the server, the mock implementation of the API;
detect, at the server, a modification of the API behavior file;
receive, from a user device, a request message indicating the mock implementation of the API; and
return a response to the request message to the user device according to the modified API behavior file and the mock implementation of the API that is maintained in the memory of the server after the API behavior file is modified.

* * * * *